United States Patent
Mitsch

(10) Patent No.: US 11,732,690 B2
(45) Date of Patent: Aug. 22, 2023

(54) DAMPING CARDANIC SUSPENSION FOR PENDULUM DAMPERS

(71) Applicant: FM ENERGIE GMBH & CO. KG, Heppenheim (DE)

(72) Inventor: Franz Mitsch, Heppenheim (DE)

(73) Assignee: FM Energie GmbH & Co. KG, Heppenheim (DE)

( * ) Notice: Subject to any disclaimer, the term of this patent is extended or adjusted under 35 U.S.C. 154(b) by 484 days.

(21) Appl. No.: 17/046,541

(22) PCT Filed: Apr. 17, 2019

(86) PCT No.: PCT/EP2019/000124
§ 371 (c)(1),
(2) Date: Oct. 9, 2020

(87) PCT Pub. No.: WO2019/201471
PCT Pub. Date: Oct. 24, 2019

(65) Prior Publication Data
US 2021/0047998 A1   Feb. 18, 2021

(30) Foreign Application Priority Data

Apr. 18, 2018 (EP) .................................. 18000373

(51) Int. Cl.
*F03D 7/02* (2006.01)
*F16F 7/10* (2006.01)
(Continued)

(52) U.S. Cl.
CPC .......... *F03D 7/0296* (2013.01); *F16F 7/1011* (2013.01); *F16F 15/02* (2013.01);
(Continued)

(58) Field of Classification Search
CPC ......... F03D 7/0296; F16F 7/10; F16F 7/1011; F05B 2260/964
See application file for complete search history.

(56) References Cited

U.S. PATENT DOCUMENTS 5,921,149 A * 7/1999 Masberg ............... H02K 7/18
  464/180
6,321,612 B1 * 11/2001 Leimbach ............ F16H 61/32
  74/473.1
(Continued)

FOREIGN PATENT DOCUMENTS

DE    37 41 578 A1    6/1988
EP    1 008 747 A2    6/2000
(Continued)

OTHER PUBLICATIONS

International Search Report Corresponding to PCT/EP2019/000124 dated Jul. 31, 2019.
(Continued)

*Primary Examiner* — Long T Tran
(74) *Attorney, Agent, or Firm* — Finch & Maloney PLLC

(57) ABSTRACT

A new type of independently damping pendulum suspension for pendulum dampers for use in tall slender constructions and technical installations, more particularly used in wind turbines. A Cardan joint is equipped with damping elements and mounted at the other end opposite the pendulum mass. The Cardan joint is able, despite the small motions, to sufficiently damp the oscillations of the pendulum produced by disturbing frequencies.

14 Claims, 8 Drawing Sheets

(51) Int. Cl.
*F16F 15/02* (2006.01)
*F16F 15/03* (2006.01)

(52) U.S. Cl.
CPC ........ *F16F 15/035* (2013.01); *F05B 2220/30* (2013.01); *F05B 2260/964* (2013.01); *F16F 2222/06* (2013.01); *F16F 2222/08* (2013.01); *F16F 2228/066* (2013.01); *F16F 2230/0052* (2013.01); *F16F 2232/00* (2013.01); *F16F 2232/02* (2013.01); *F16F 2234/04* (2013.01)

(56) References Cited

U.S. PATENT DOCUMENTS

| | | | |
|---|---|---|---|
| 10,400,754 B2* | 9/2019 | Rodriguez Tsouroukdissian | ........ F16F 15/02 |
| 10,550,910 B2 | 2/2020 | Glanzner | |
| 11,441,311 B1* | 9/2022 | Gant | ........................ E04B 1/98 |
| 2007/0131504 A1 | 6/2007 | Bronowicki et al. | |
| 2009/0173148 A1* | 7/2009 | Jensen | .................... F03D 17/00 73/116.03 |
| 2010/0314884 A1* | 12/2010 | Ollgaard | ................. F03D 13/20 290/55 |
| 2012/0063915 A1 | 3/2012 | Kawabata et al. | |
| 2014/0035287 A1* | 2/2014 | Smith | ..................... F03D 80/70 290/55 |
| 2014/0302957 A1* | 10/2014 | Boing | ..................... F03D 15/00 475/31 |
| 2020/0158083 A1* | 5/2020 | Nitsche | ................. F03D 7/0296 |
| 2020/0284240 A1 | 9/2020 | Mitsch | |
| 2021/0356011 A1* | 11/2021 | Mitsch | .................. F16F 1/3828 |

FOREIGN PATENT DOCUMENTS

| | | |
|---|---|---|
| EP | 2 696 072 A1 | 2/2014 |
| EP | 2 730 709 A1 | 5/2014 |
| EP | 2 730 799 A1 | 5/2014 |
| WO | 2009/068599 A2 | 6/2009 |
| WO | 2012/121694 A1 | 9/2012 |
| WO | 2016/023628 A1 | 2/2016 |
| WO | 2019/029839 A1 | 2/2019 |

OTHER PUBLICATIONS

Written Opinion Corresponding to PCT/EP2019/000124 dated Jul. 31, 2019.

* cited by examiner

Fig. 9.1
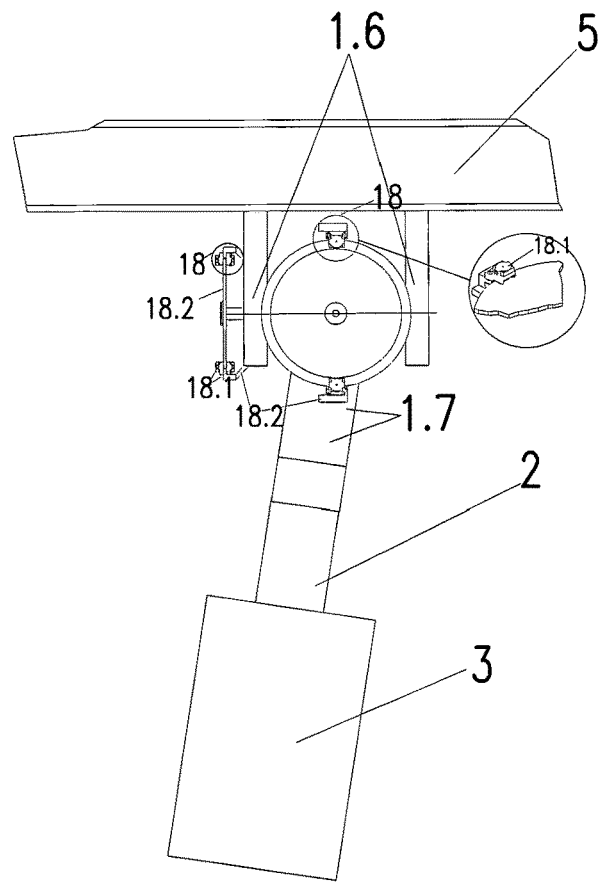
Fig. 9.2
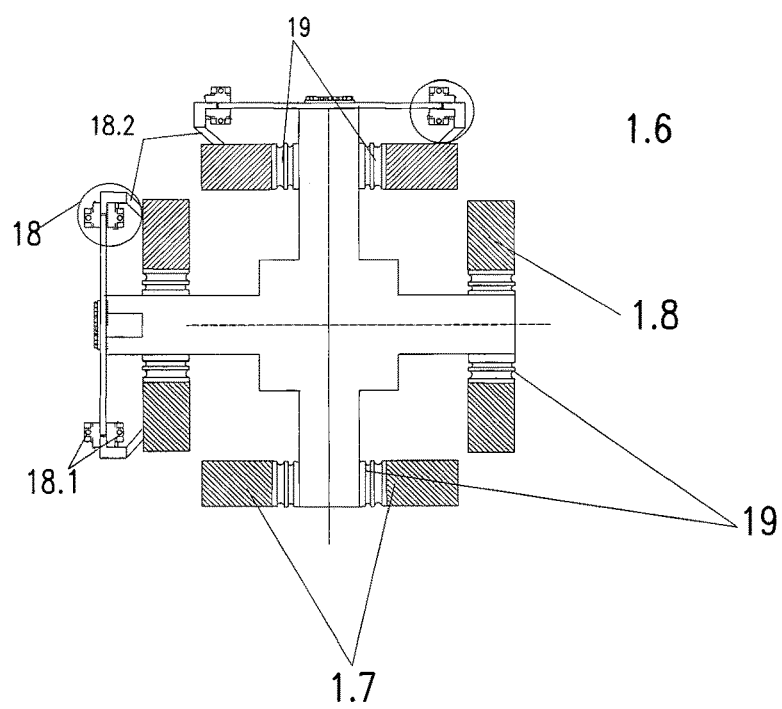

Fig. 9.3
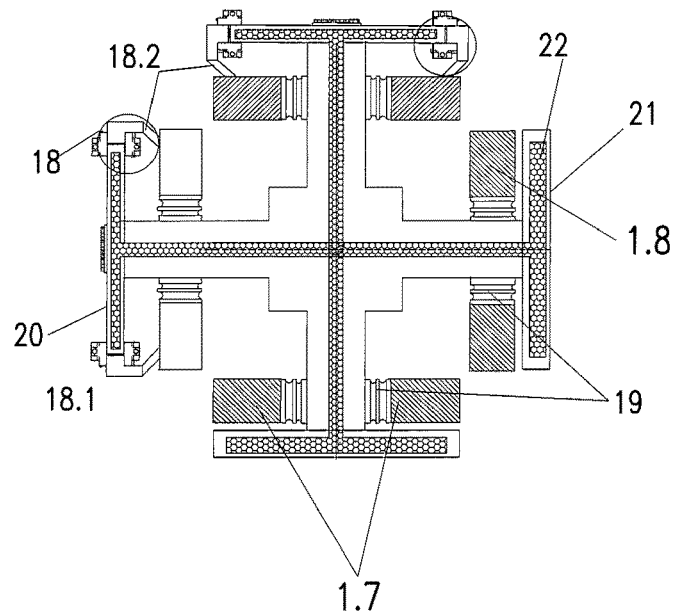
Fig. 9.4
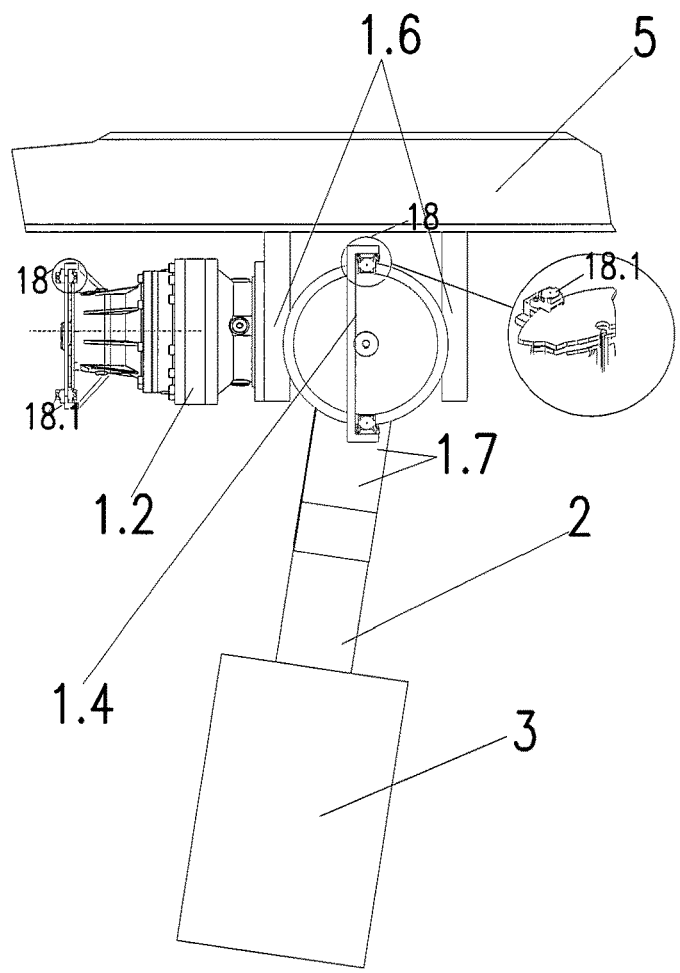

DAMPING CARDANIC SUSPENSION FOR PENDULUM DAMPERS

SUBJECT MATTER OF THE INVENTION

The invention relates to a new type of independently damping pendulum suspension for pendulum dampers for use in tall, slender structures and technical installations, in particular wind turbines.

The invention relates in particular to a Cardan joint which is equipped with damping elements and is attached at the other end with respect to the pendulum mass, and which has two cross-connected shafts and is capable of sufficiently damping the vibrations of the pendulum generated by interference frequencies despite the low mobility present at this point.

BACKGROUND AND OBJECT OF THE INVENTION

Tall and slender buildings and installations are subject to special vibration conditions which must be taken into account by technical measures to prevent damage or premature fatigue processes. This applies in particular to wind turbines which, due to their rapid technical development in recent years, are increasingly being used in more extreme locations (e.g. offshore) and at higher altitudes, and also have ever higher towers in order to take advantage of the better wind conditions there. Such wind turbines have to withstand the forces acting on them due to wind, waves, weather and operation, which place different loads on the turbines at different points. Vibration forces in particular can endanger the operation and safety of the turbines.

Not only during operation, but also during the erection of the wind turbine or a high tower, vibrations occur due to wind or other forces, which can endanger the construction in particular because turbines under construction are not yet optimally adapted to such disturbing vibrations.

In the construction of wind turbines, the tower is first erected in segments. Then the nacelle with the rotor is mounted. The situation without a nacelle (tower stump alone) is critical with regard to resonance excitation, since in this state larger vibration amplitudes can occur than is the case with a nacelle. Tuned mass dampers for such purposes are always placed on the end of the uppermost tower segment and bolted there. This procedure is repeated until the tower is completely erected and the nacelle can be put on. The natural frequency of the system decreases as the assembly progresses. The damper frequency therefore has to be easily adjustable over a wide range (approx. factor 2) and is generally at a higher level compared to the completed turbine.

It is therefore necessary to damp the vibrations occurring in these turbines in a targeted and effective manner using technical measures. This is done using tuned mass dampers or vibration dampers of a different design according to the various different fields of application.

Most of the disturbing forces also affect the tower of the turbine, which is usually excited to vibrate at a low natural frequency, usually <1 Hz. For this reason, in the prior art pendulum dampers which are usually suspended in the tower are often used for vibration damping.

Pendulum dampers for wind turbines are known in the art. For instance, EP 1008747 (B1) describes a pendulum damper which has a resilient damping element in the joint bearing of the pendulum. This technical solution is particularly space-saving, but is disadvantageous in that only small distances are available for the movements in the joint which lead to damping, and therefore the damping effect is often insufficient, and additional damping must be provided within the tower at the pendulum. WO 2009/068599 describes a pendulum damper in which the vibrations of the pendulum mass are damped by friction damping using various plates. The influence on the frequency by the temperature is negligible in friction elements.

Similar difficulties arise when using fluid dampers. Here there is a temperature influence, but this is largely prevented by our compensation. The ever-present space problem is the same for all dampers.

To counteract this, magnetic or eddy current dampers in combination with pendulum dampers have been proposed. In conventional magnetic dampers, damping is achieved by attraction or repulsion of magnets with opposite or the same polarity, which are moved past each other. Eddy current dampers are functionally based on the fact that a current is induced in an electrical conductor that moves through an alternating magnetic field. The resulting eddy currents in turn form magnetic fields which counteract the original magnetic field and decelerate the movement of the conductor. If the speed at which the conductor moves in the magnetic field increases, the eddy current in the conductor increases, which leads to a stronger magnetic field, resulting in the movement being decelerated further and to a greater extent.

Magnetic or eddy current dampers are known as such in the art. For instance, DE 37 41 578 A1 describes a vibration damping device for precision machines which is based on the movement of a plate between the north and south pole of a magnetic field. US 2007/0131504 describes a planar vibration damper in which a transversal pendulum device is moved in the field of magnetic fields arranged in a planar manner. EP 2 696 072 describes a tuned mass damper arrangement for wind turbines with a mass pendulum and a planar magnetic and conductor element, with a sliding arrangement, in particular a sliding layer, being inserted between the elements, which arrangement is intended to ensure a compact design of the damper with only low temperature dependence. The mass pendulum is in this case guided in preferably two vibration devices in the case of vibration, with there being a movement of the conductor plate relative to the magnetic plate at the lower end of the mass pendulum.

Said magnetic dampers are disadvantageous in that they are very direction-dependent and cannot be axially rotated. Furthermore, they often cannot be used to achieve sufficiently high damping densities of often more than 1000 kNs/(m×m$^3$), which are, however, absolutely necessary when using wind turbines, in particular wind turbines with towers of 100 m height and above. WO 2016/023628 describes an eddy-current tuned mass damper which can reach and exceed these high damping densities and which is also direction-independent. The damper substantially consists of a cylinder tube, which has a magnet arrangement, and a conductor tube which is guided and movable inside.

All known magnetic or eddy current dampers have the property whereby the counterforce which generates the eddy current field and opposes the movement of the mass depends on the speed of the movement. However, since in high towers such as wind turbines or even in tall structures, slow movements are often generated by the excitation frequency (wind, earthquakes, etc.), the problem arises that the generated force of the eddy current field is not sufficient to provide sufficient damping for particularly slow movements. The same applies if the amplitudes of the vibration are low. This can be helped by increasing the magnetic density, for example by increasing the number of magnetic elements in general or per area. However, this not only increases costs but also the required space, which is often not available, especially in the towers of wind turbines. In addition, this measure results in a reduction in temperature independence, since significantly more heat is generated in a confined space due to the increased vibration energy.

The problem was therefore that of providing magnetic dampers for damping natural frequencies of below 10 Hz, in particular below 5 Hz, in particular below 0.5 Hz, preferably between 0.1 and 0.5 Hz for the first tower frequency and 1-2 Hz for the second tower frequency in tall and slender structures and technical installations, in particular in wind turbines, which no longer exhibit the disadvantages described, in particular the rather low damping in conditions with low kinetic energy combined with a low space requirement.

The problem has been solved by providing the independently damping pendulum suspensions specified below and in the claims, and by providing pendulum dampers having such damping suspensions.

SUMMARY OF THE INVENTION

The problem has been solved in particular by the intrinsically linear movement of the vibrating mass of a pendulum damper being converted, by means of a pendulum suspension which has a universal or Cardan joint and at least one eddy-current rotating component on each shaft of the joint, into a rotational movement, as a result of which the rotational speed that can be achieved can be increased by a multiple of the linear speed of the moved mass, not only by the choice and size of said preferably rotationally symmetrical rotating component, but also by connecting, upstream, at least one transmission gearing between the universal joint (Cardan joint) and the eddy-current rotating component.

If desired, an additional rotating mass can be integrated into the pendulum suspension or the rotating component, as a result of which there can be a variable and adaptive influence on the natural frequency of the vibration system to be damped, e.g. a wind turbine.

If the conductor elements are moved relative to the magnetic elements of the eddy-current rotating component by rotation, a high damping effect can be produced which depends on the speed. As already mentioned, the speed of the rotating movement is decisive for the damping effect to be achieved with the eddy current principle used here. According to the invention, it is thus possible, depending on the design, to achieve approximately 4-400 times the speed of the rotating conductor elements compared with the stationary magnetic elements (or vice versa) and thus a corresponding multiple of the damping force compared with the known eddy current dampers.

In order to achieve high speeds in the pendulum suspension which, in contrast with the damper mass at the other end of the pendulum, experiences only small movements or small movement distances due to the excitation vibration, according to the invention at least one transmission gearing having a transmission ratio of between approximately 5:1 and 500:1, in particular between 10:1 and 200:1, preferably between 10:1 and 100:1, is provided between the universal joint and the eddy-current rotating component.

The subject matter of the invention is therefore a damping pendulum suspension (1) for pendulum dampers in a vibration system, which comprises a Cardan or universal joint (1) having two cross-connected shafts (1.3), and a holding device (1.7) for receiving and holding a pendulum rod with a pendulum mass, each of the two shafts (1.3) of the Cardan joint (1.1) having at least one transmission gearing (1.2) or a brake device (18) or a lever device (25)(26) and a rotating damping unit (1.4) which generates an eddy current and is attached to the rapidly rotating gearing output side or the side of the devices (18)(25)(26). Preferably, according to the invention each of the two shafts of the Cardan joint has a gearing on one side of a shaft. In a further preferred embodiment, the pendulum suspension according to the invention comprises two gearing units, preferably having a transmission ratio between 5:1 and 500:1, and one damping unit each, the one gearing damping unit being arranged on one side of a shaft and the other gearing damping unit being arranged on one side of the other shaft of the universal joint. In a further embodiment of the invention, the two (opposite) ends of a shaft of the universal joint are each equipped with a gearing damping unit, i.e. for example with a total of four gearing damping units. The universal joint used according to the invention is preferably equipped on each of the two shafts (1.3) with an eddy-current damping element (1.4) and a transmission gearing (1.2) or optionally with a brake device (18) or a lever device (25)(26). Usually, the shafts of the Cardan joint are equipped at their free ends with roller, sliding or elastomeric bearings known in the art, for example in the form of cylindrical or conical elastomeric bushings.

The damping unit (1.4) operated with eddy current comprises a preferably rotationally symmetrical conductor disk (1.4.3) as well as a disk (1.4.2), provided with permanent magnets or electromagnets, which is also preferably rotationally symmetrical and is made of, for example, steel, ceramics or plastics material. The two disks are arranged opposite one another and separated from one another by an air gap, and move, triggered by a pendulum movement, relative to one another about the shaft (1.3), as a result of which an eddy current is generated which generates a force that opposes the force moving the pendulum, so that the pendulum movement is damped or decelerated.

In another embodiment of the invention, the eddy-current damping unit (1.4) additionally has a rotating mass, as described in WO 2019/029839. An optional variably adjustable rotating mass (1.4.1) is attached to the relevant rotating disk (1.4.3) or (1.4.2). By this means and additionally by using disks having different diameters to increase the speed of rotation of the regions of the disks with the magnets, the natural frequency of the vibration system can be influenced or the vibration system can be adapted to the vibration conditions.

The subject matter of the invention therefore also involves corresponding pendulum dampers which have at least one pendulum suspension according to the invention.

This may be a conventional pendulum damper with a pendulum rod (2) and a pendulum mass (3), in which the pendulum suspension (1) is attached to the end of the pendulum rod (2) opposite the pendulum mass, but it may also be a transversal pendulum damper which has at least one pendulum suspension according to the invention directly on the pendulum mass or on linkage rods articulated on the mass. For this purpose, a second Cardan or ball joint (8) is required on the damping pendulum rod.

The pendulum suspension according to the invention as well as pendulum dampers equipped therewith can be used and operated as optionally adaptive, frequency-adjustable vibration dampers in especially tall and slender installations, machines and structures, in particular wind turbines. In wind turbines, the pendulum dampers according to the invention can in the tower, preferably in the middle to upper region, and/or in the nacelle and/or alternatively therebelow, or possibly also below a helicopter platform of a wind turbine.

The subject matter of the invention therefore involves wind turbines and similar tall installations or buildings having comparable vibration characteristics, which have the pendulum suspensions or pendulum dampers described above and below.

In wind turbines, the pendulum suspension according to the invention or the pendulum damper according to the invention can be used in particular to damp the 1st tower natural frequency between approximately 0.1 Hz and approximately 0.5 Hz and the 2nd tower natural frequency between approximately 0.5 Hz and 1.5-2 Hz.

BRIEF DESCRIPTION OF THE DRAWINGS

FIG. 8a shows the installation of a pendulum damper, according to the invention, comprising a pendulum suspension, according to the invention, beneath the nacelle of a wind turbine, while FIG. 8b shows the installation of a pendulum damper, according to the invention, comprising a pendulum suspension, according to the invention, within the nacelle (b).

FIG. 9.1 shows the damper without a gearing with a disk brake and the brake is directly linked to the Cardan joint.

FIG. 9.2 shows the damper (plan view) without a gearing with disk brakes and with cylindrical elastomeric bushings or conical elastomeric bushings.

FIG. 9.3 shows the damper of FIG. 9.2 but with a cooling container with cooling fluid which is opposite the coolable brake disk.

FIG. 9.4 shows a damper having a gearing (and eddy current dampers) with an additional disk brake.

MORE DETAILED DESCRIPTION OF THE INVENTION AND THE EMBODIMENTS

Figure 1:
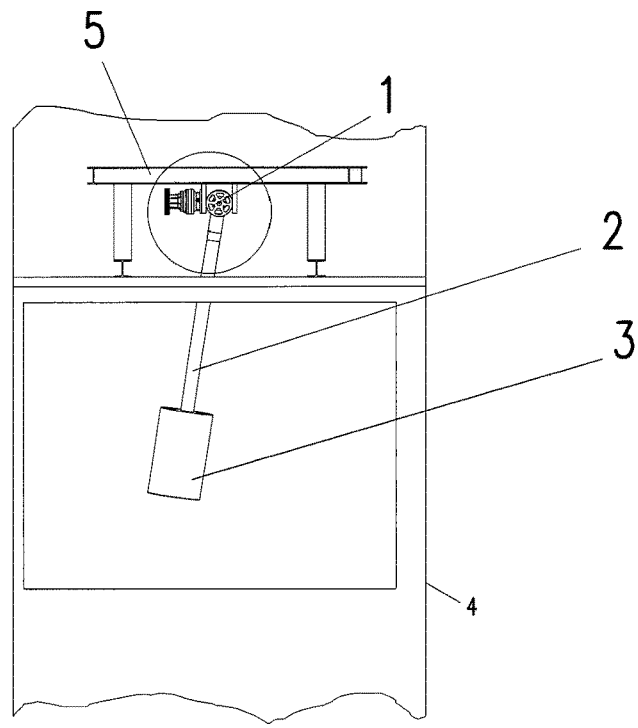
FIG. 1 a shows a pendulum damper which is mounted in a slender building or in the tower, e.g. a wind turbine by a support structure.

The conductor disk (1.4.3) of the damping component (1.4) consists of a material which conducts the electric current well, such as aluminum or copper or corresponding alloys thereof. However, according to the invention, the conductor disk may also be in the form of a plate, strip, ring or individual parts arranged on a carrier plate, carrier strip or carrier ring (1.4.4 in each case).

The magnetic elements (1.4.2) of the damping component (1.4) are preferably formed by magnetic rings or, for practical reasons, individual rod magnets which are arranged on a carrier plate, carrier wheel, carrier strip or carrier ring (1.4.1 in each case). Adjacent magnetic elements are preferably positioned such that the north and south pole face one another. It is also possible to use corresponding electromagnetic elements, which are advantageous in that the field strength can be controlled and optionally even deactivated, meaning adaptive damping can be made possible.

In one embodiment of the invention, the conductor disk is mounted so as to rotate and the magnetic disk is mounted so as to be stationary. The conductor disk or carrier disk (1.4.4) for the conductor elements (1.4.3) is in this case driven by the rapidly rotating gearing output side (1.4.5), while the magnetic disk or carrier disk (1.4.1) for the magnet arrangement (1.4.2) is connected to the stationary part of the gearing or the pendulum suspension. The conductor disk or plate, or carrier disk/plate for conductor elements, preferably consists of aluminum or copper or alloys thereof.

In an alternative embodiment, the magnetic disk or carrier disk (1.4.1) with the magnets (1.4.2) attached thereto is driven by the rapidly rotating gearing output side (1.4.5), and the conductor disk or carrier disk (1.4.4) for the conductor (1.4.3) is rigidly connected to the gearing or other parts of the pendulum suspension.

The relevant rotating element (at least one for each shaft (1.3) of the Cardan joint thus has either the conductor function or the magnetic function of the eddy-current damping arrangement (1.4). The stationary element is always arranged opposite thereto, with the two elements or disks being separated from one other by a small, substantially constant air gap of approximately 1-5 mm. The on account of the linear movement of the pendulum device, consisting of the pendulum rod (2) and pendulum mass (3), the rotating disk is thus moved relative to the stationary disk, as a result of which an eddy current with a magnetic field is induced which counteracts the rotation and leads to damping ultimately of the vibrating mass (3) and thus of the vibration system.

In a further embodiment of the invention, the magnetic elements are attached to the lateral surface of the disk or wheel (the rotating or stationary element) at a particular variable radius from the center of rotation, and are preferably arranged radially. The magnetic elements can also be arranged in several rows with different radii. The value of the radius determines the speed with which the magnet arrangement moves relative to the conductor element, and thus also the damping effect. The size or diameter of the disks and the arrangement of the magnet and conductor elements thereon thus determines the speed of rotation which is decisive for the eddy current effect.

The eddy-current damping effect can also be enhanced by using ferromagnetic elements, such as an iron or steel disk, which are in contact with the conductor disk or its elements (1.4.3)(1.4.4).

In order for effective damping to be achieved by the principle according to the invention, the speed of the disks on the shafts of the universal joint must be as high as possible, although the movement and distance in a joint of a pendulum are naturally small. This can be achieved only by using an appropriate gearing, which is arranged between the relevant shaft of the Cardan joint and the eddy-current damping element (1.4) such that the rapidly rotating output side of the gearing is connected to said damping unit.

Suitable transmission gearings have a transmission ratio between approximately 5:1 and 500:1 or 10:1 and 200:1, preferably between 10:1 and 100:1. With a ratio of, for example, 100:1 in a 3-stage transmission, for example, relatively few magnets in the damping unit (1.4) can be used to achieve damping, on account of the ultimately effective long distance and high speed achieved, said damping being sufficient for damping even larger installations sufficiently well.

A pendulum with a length of e.g. 2 m and a radius of the rotating disk of e.g. 0.2 m and a gearing transmission ratio of e.g. 100:1 results in a magnification factor of 2/0.2*100=10.

In this example, this means that only approximately 10% of the damping force which would be required in the case of a magnetic linear damper attached directly to the pendulum would have to be applied. Conversely, this would mean that, by means of the pendulum suspension according to the invention, only approximately 10% of the magnets which are needed in the case of a magnetic linear damper on the pendulum mass would be required in order to achieve the same damping effect under otherwise identical conditions. Since the magnets are usually made of rare materials, this is a very important economic factor.

FIG. 1: shows a pendulum damper which is mounted in a slender building or in the tower (4) e.g. of a wind turbine by means of a support structure (5). The pendulum damper consists of a pendulum mass (3) fastened to a pendulum rod (2). The pendulum rod is movably fastened to the pendulum suspension (1) according to the invention with the Cardan joint (1.1) and eddy-current damping components (1.4) and can be moved in all directions of the horizontal plane on account of the Cardan or universal joint used. The pendulum suspension is in turn rigidly connected to a support structure (5). Alternatively, it can, however, also simply be connected directly to the installation or building or tower. The Cardan joint is equipped on each shaft (1.3) with an eddy-current damping element (1.4) and a transmission gearing (1.2).

Figure 2:
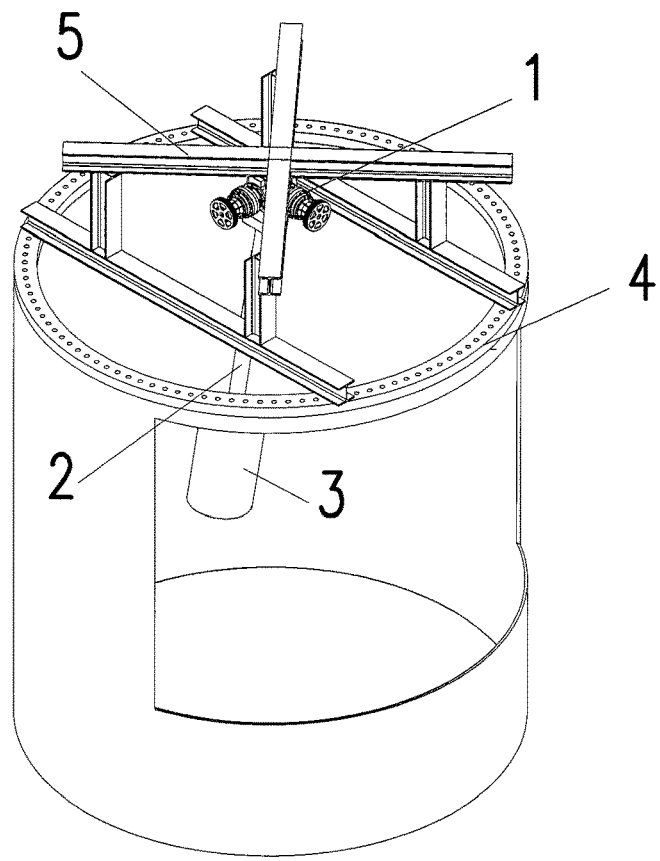
FIG. 2 shows the same pendulum damper as shown in FIG. 1, but now in perspective view.

FIG. 2: shows the same pendulum damper as shown in FIG. 1, but now in perspective view.

Figure 3:
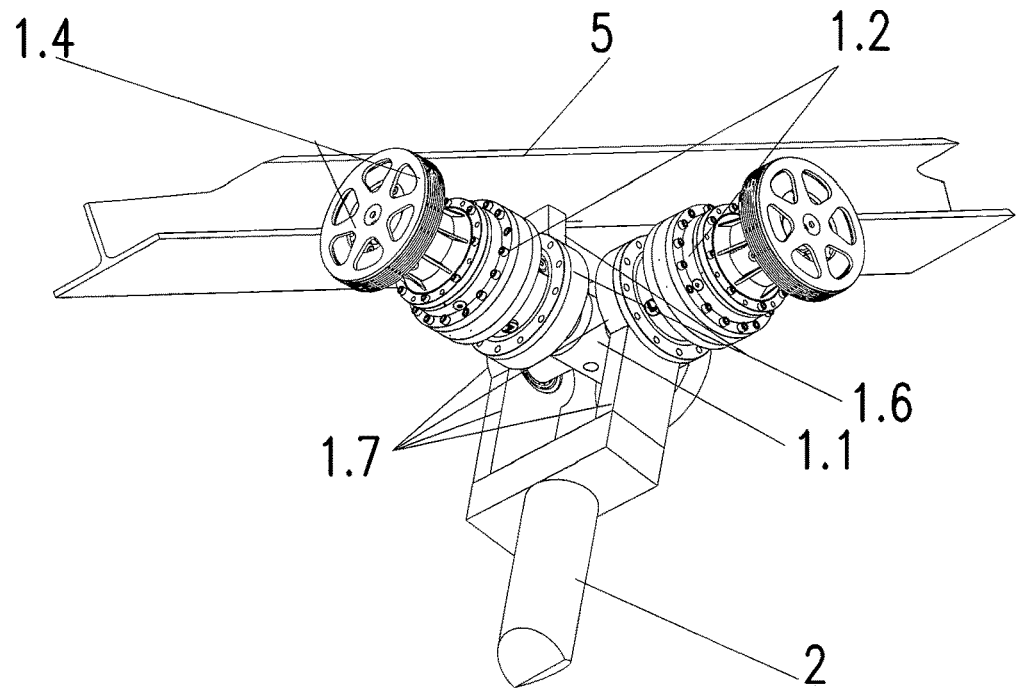
FIG. 3 is a perspective view of the pendulum suspension (1) according to the invention, which is fastened to the support structure (5).

FIG. 3: is a perspective view of the pendulum suspension (1) according to the invention, which is fastened to the support structure (5). The pendulum suspension comprises the Cardan joint (1.1) and a total of two transmission gearings (1.2) and the two shafts of the universal joint. The pendulum rod (2) at the lower end of the suspension (1.7) is shown only in part. The two damping elements (1.4) on the shafts are provided with rotating masses (1.4.7), which are optional, and can be omitted if necessary if no additional frequency setting is desired or required.

Figure 4:
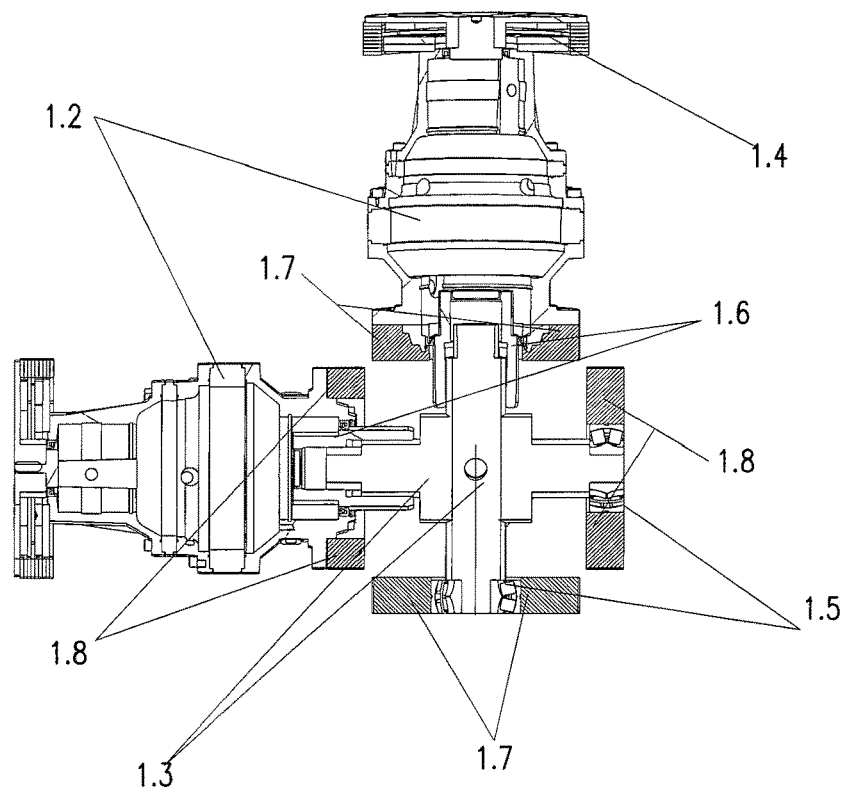
FIG. 4 shows the pendulum suspension from FIG. 3, but in plan view.

FIG. 4: shows the pendulum suspension from FIG. 3, but in plan view. This view additionally shows that the shafts of the Cardan joint are mounted (1.5) at their free ends according to the prior art. These bearings can be roller, sliding or elastomeric bearings, for example resilient bushing bearings.

Figure 5:
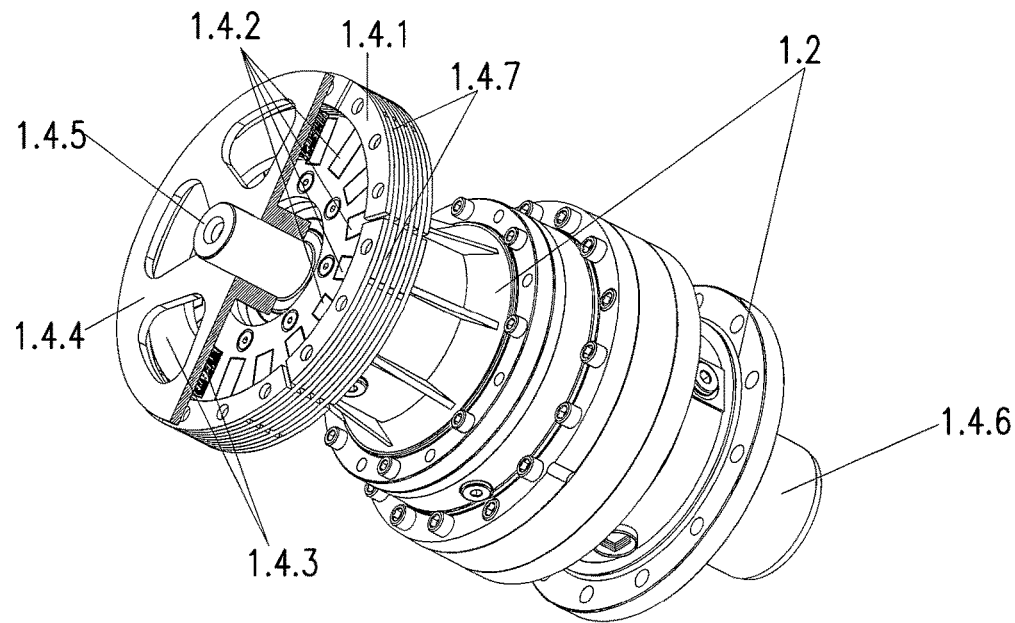
FIG. 5 is a detailed, perspective view of the arrangement of the gearing and the eddy-current damping device.

FIG. 5: is a detailed, perspective view of the arrangement of the gearing (1.2) and the eddy-current damping device (1.4). The slowly rotating gearing input (1.4.6) of the gearing (1.2) is connected (not shown) to the suspension (1.7). On the output side, the rapidly rotating part of the gearing (1.4.5) is connected to the damping element (1.4), in particular directly to the co-rotating conductor disk, which consists of the carrier disk (1.4.4) and the actual conductor element (1.4.4). The non-rotating carrier disk (1.4.1) is attached to the housing of the gearing, to which disk the magnet arrangement (1.4.2), in this case consisting of individual, radially oriented magnets, is attached. The carrier disk (1.4.1) in this case has rotationally symmetrical mass disks (1.4.7) on the rear side. This embodiment having the additional mass disks is, as mentioned above, optional and not absolutely necessary according to the invention.

Figure 6:
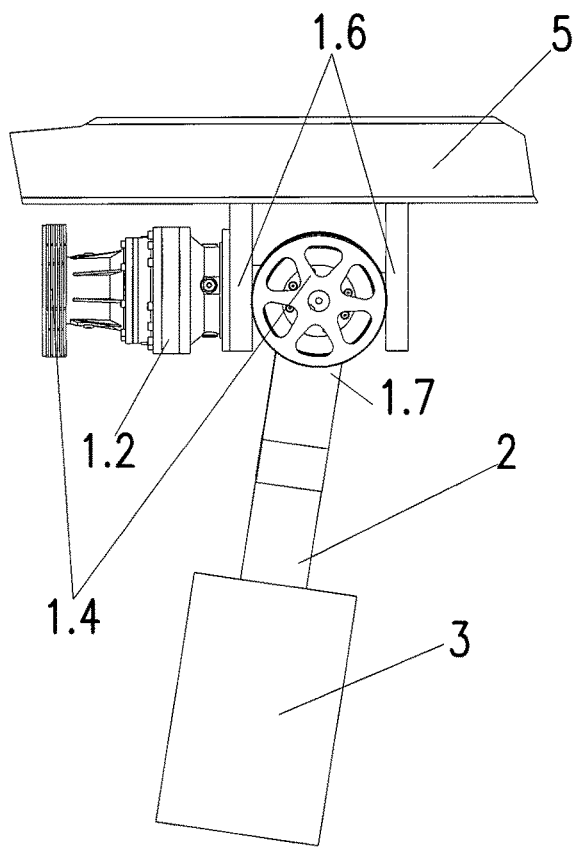
FIG. 6 shows a pendulum damper according to the invention in side view.

FIG. 6: shows a pendulum damper according to the invention in side view. In addition to the support structure (5), a holding device (1.6)(1.7) for the Cardan joint (1.1) is also shown in addition to FIGS. 1 and 2.

Figure 7:
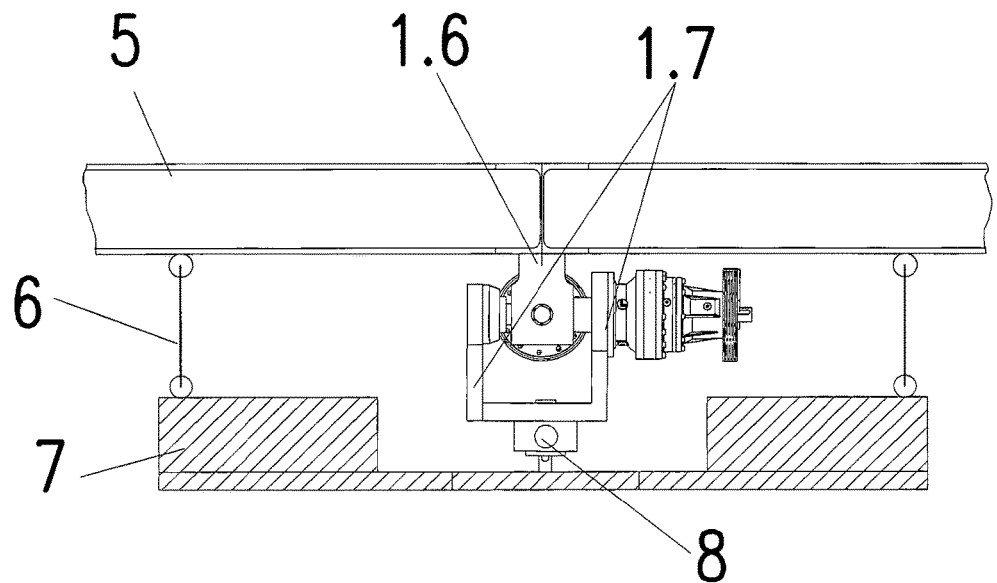
FIG. 7 shows a pendulum damper designed as a transversal damper and having a pendulum suspension according to the invention.

FIG. 7: shows a pendulum damper designed as a transversal damper and having a pendulum suspension (1) according to the invention. The pendulum mass (7) moves horizontally and is connected to the support structure or the building by means of a plurality of linkage rods (6) and is connected to the pendulum suspension (1) according to the invention via a further joint (8).

Figure 8:
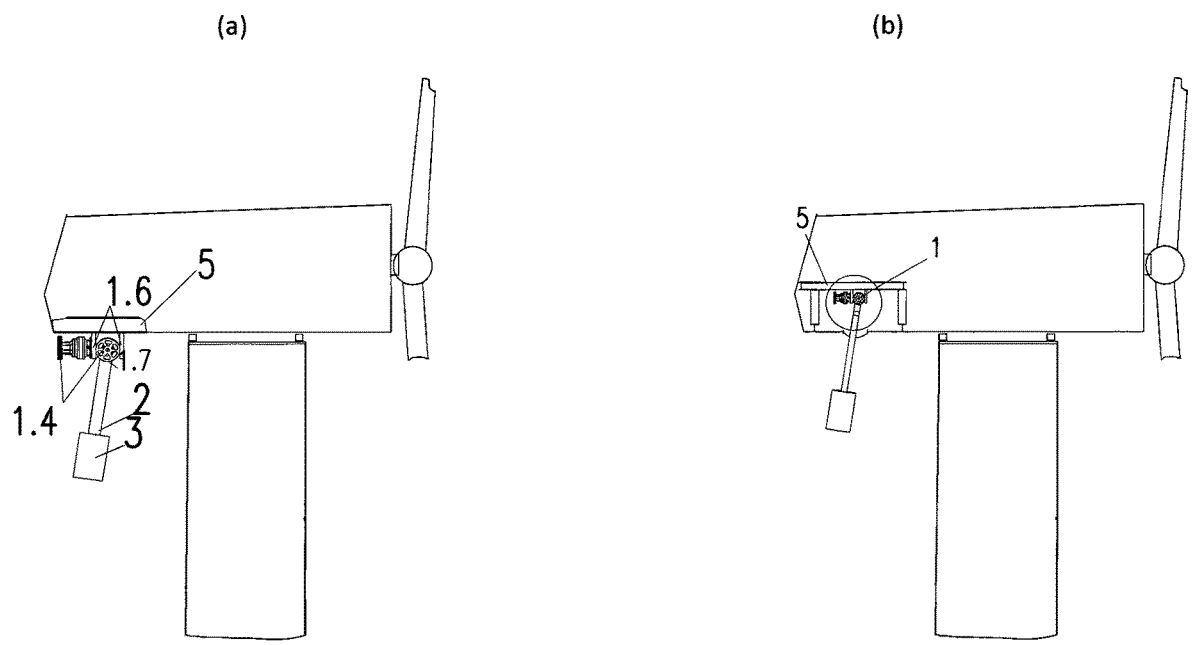

FIGS. 8a, 8b: shows the installation of a pendulum damper according to the invention comprising a pendulum suspension according to the invention beneath the nacelle (a) of a wind turbine and, alternatively, within the nacelle (b).

FIG. 9: shows a pendulum damper having a Cardan joint according to the invention, with and without a gearing and with disk brakes:
  a. FIG. 9.1 shows the damper without a gearing with a disk brake (18), said brake being directly linked to the Cardan joint;
  b. FIG. 9.2 shows the damper (plan view) without a gearing with disk brakes (18) and with cylindrical elastomeric bushings (19) or conical elastomeric bushings (19.1);
  c. FIG. 9.3 shows the damper from FIG. 9.2 but with a cooling container with cooling fluid (21)(22) which is opposite the coolable brake disk (20); and
  d. FIG. 9.4 shows a damper having a gearing (and eddy current dampers) with an additional disk brake (18).

Figure 10:
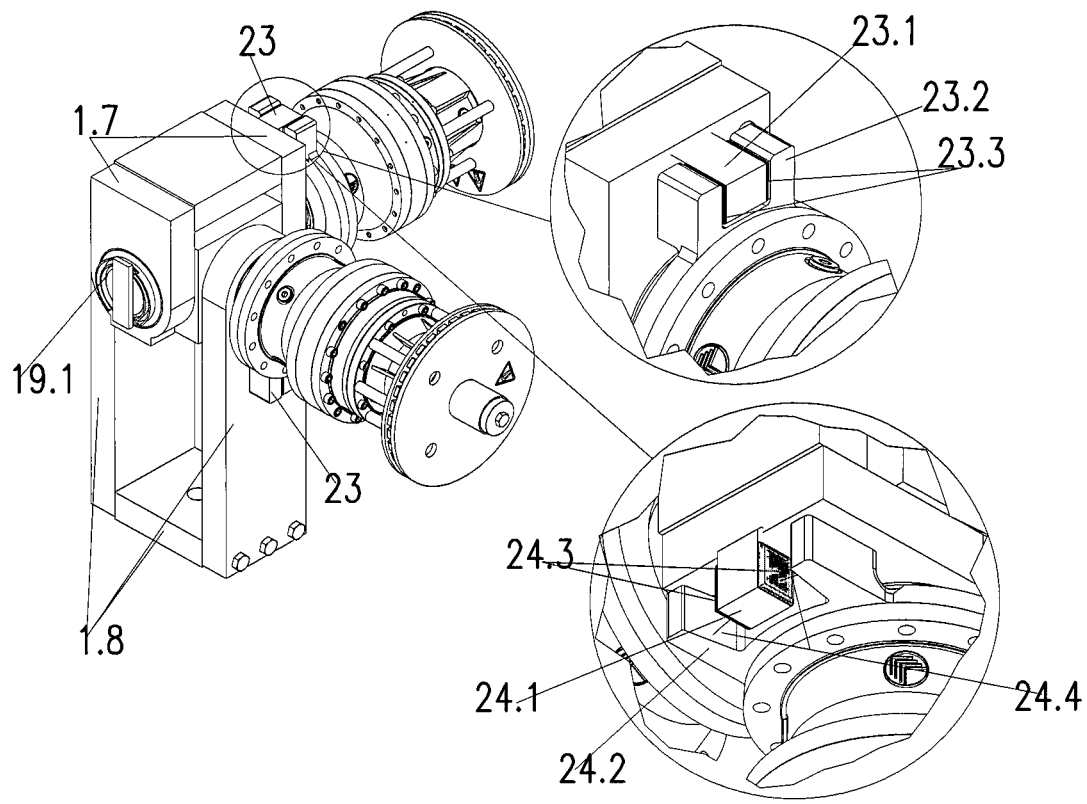
FIG. 10 shows the Cardan joint as a component of the pendulum suspension according to the invention in one embodiment, which has elastomeric bushings and torque arms and torque arms having an idle angle.

FIG. 10: shows the Cardan joint as a component of the pendulum suspension according to the invention in one embodiment, which has elastomeric bushings (19)(19.1) and torque arms (23)(23.1 inner lever) (23.2 outer lever) (23.3 resilient stop) and torque arms having an idle angle (24) (24.1: inner lever), (24.2 outer lever) (24.3 resilient stop) (24.4 free movement angle).

Figure 11:
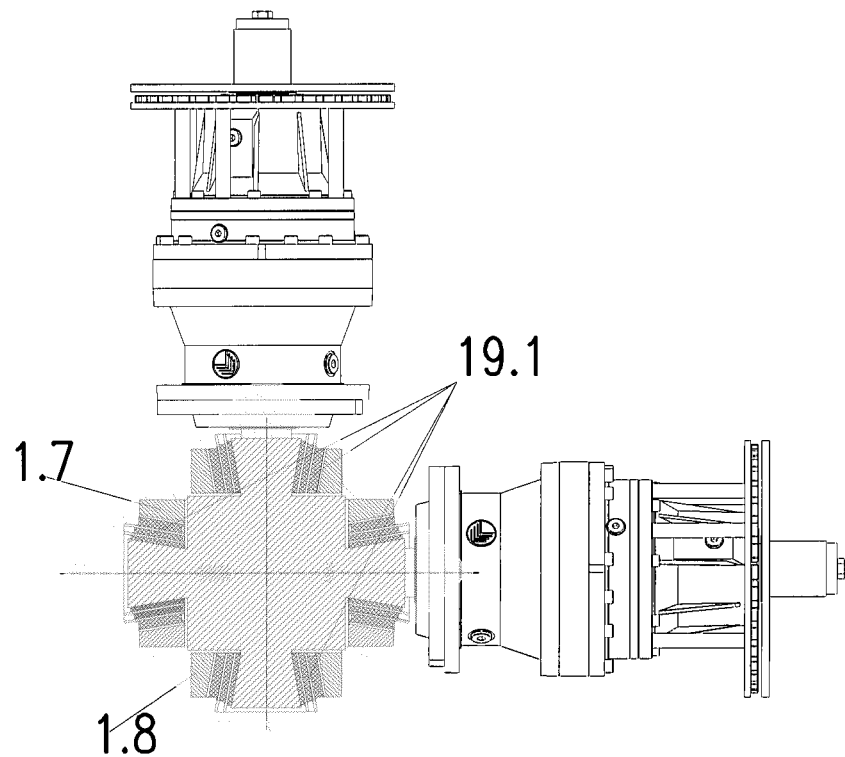
FIG. 11 shows a section through the elastomeric bearing with conical elastomeric elements.

FIG. 11: shows a section through the elastomeric bearing with conical elastomeric elements (19.1).

Figure 12:
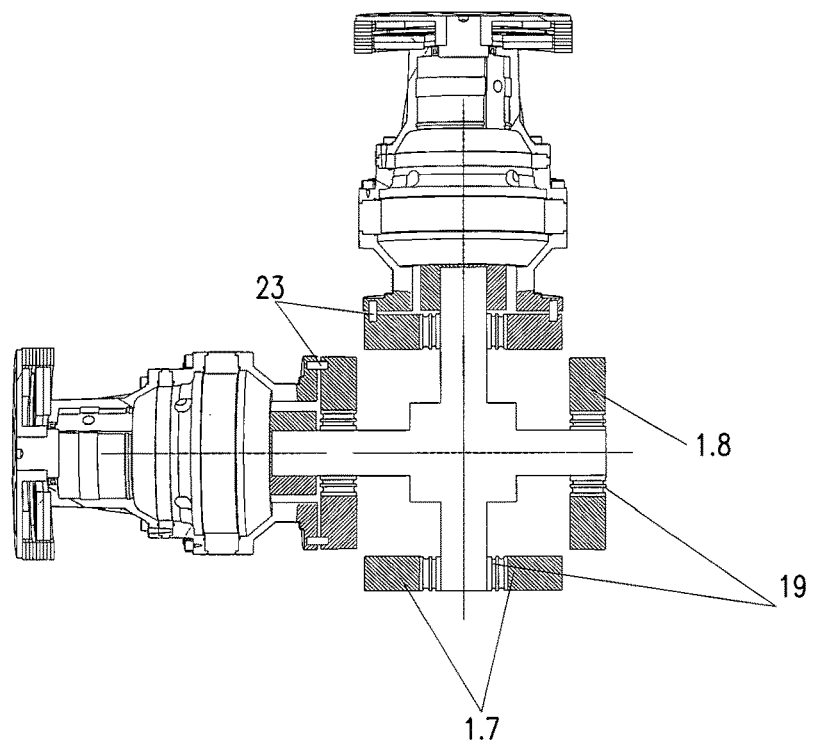
FIG. 12 shows a section through the elastomeric bearing with cylindrical elastomeric elements.

FIG. 12: shows a section through the elastomeric bearing with cylindrical elastomeric elements (19).

Figure 13:
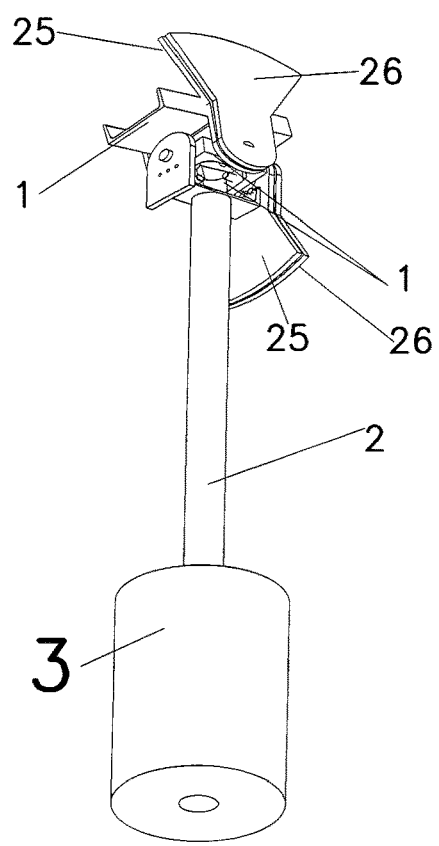
FIG. 13 shows a pendulum damper having a Cardan suspension according to the invention without a gearing, which suspension has, at the free ends, at least one, preferably in each case one lever device in the form of two pointers.

FIG. 13: shows a pendulum damper having a Cardan suspension according to the invention without a gearing, which suspension has, at the free ends, at least one, preferably in each case one lever device in the form of two pointers (25)(26). Said pointers result in larger leverage and thus larger transmission. In this case, the first pointer (25) is stationary, whereas a second pointer (26) rotates with the pendulum angle and this allows a larger relative movement. The pointers can have any desired form, but should not result in any restriction of the movement. The length of the pointers can also be as long as e.g. the pendulum rod, depending on space requirements. The stationary and the movable pointer can work according to the eddy current system (magnets on the first and conductor elements on the second pointer) or can also be damped or fixed by mechanical braking elements (friction).

The pendulum suspension according to the invention with a Cardan joint makes it possible for numerous different pendulum dampers to be fitted for wind turbines and other tall, slender buildings.

Damper with Brake and with or without Gearing:

Since a higher braking force can be achieved with the disk brake than with eddy current, the speed increase is not absolutely necessary in the case of the Cardan damper connection. This means that no gearing is required for this embodiment with a disk brake. To achieve even higher damping forces with relatively low braking forces, it is also possible to combine a gearing with braking devices such as disk brakes. In such systems, the damping can be achieved by means of eddy current and the disk brake is only used to partially reinforce the dampers. Furthermore, it is possible to secure the damper to the brake, for example for maintenance work.

It is also possible to use dampers with hydraulic damping, in addition or even as an alternative to the eddy-current damping elements described, for example by using hydraulic torsion damper elements.

Different Damping and Natural Frequency in Two Directions:

It is also possible to design the gearing on the Cardan/universal joint according to the invention with different damping and a different transmission ratio. In this way, structures can be damped to different degrees in different directions. By applying different rotating masses and/or different transmission ratios, it is also possible to damp two frequencies in two different directions with a common mass.

Embodiment with Elastomeric Bearings:

As described, the two shafts of the Cardan joint are mounted at the free end by means of conventional roller or sliding bearings. Since in particular roller bearings are subject to wear, elastomeric bushings (19) (pos 19), including in conical form (19.1), can also be used together with the Cardan joint suspensions according to the invention instead of the roller bearings. For larger torsional angles, multi-stage bearing elements suitable for large angles of rotation can be used if necessary. In the embodiment with elastomeric bearings, the slowly rotating gearing input side is rigidly connected to the shafts of the Cardan joint (1.3). In order to be able to transmit the rotary motion, the gearing housing is fixed via a torque arm (23). Ideally, the torque arm transmits only the circulating torque and is mounted as load-free as possible in the remaining spatial axes. The torque arm is usually installed in a form-fit manner so that the entire angle of movement of the damper is shifted into the gearing rotation. In order to achieve a pulse effect, the torque arm can allow a free angle without damping. For this purpose, in the torque arm with an idle angle (24) there is a free space between the inner lever 24.1 and the outer fork 24.2 (FIG. 10) such that the torque arm is stopped after a defined angle corresponding to a defined damper amplitude. In the variant with four gearings, it is also possible to combine two stop systems. In this case, one pair of gearings becomes active even at small angles, limited by the torque arm (23), whereas the second pair of gearings engages, as part of the free space of a larger angle, in the torque arm with an idle angle, pos 24, only when stronger vibrations occur.

Fan Blades and Water Cooling:

Since in this embodiment a great deal of energy is consumed in a small space, it is advantageous that the slightly hot-running conductor disks reach a relatively high speed on account of the transmission ratio, thus enabling effective cooling. To further improve the cooling, it is possible to attach additional fan blades to the rotating disk.

For the slowly rotating embodiments without a gearing or for large damping performances and embodiments with a gearing, this is not always sufficient, meaning additional cooling is required. In principle, this is also possible by installing active fans. Furthermore, additional disks through which water flows and which are connected to the cooled brake disk (20) can provide the cooling. Passive water coolers can also be installed in this system. With the corresponding eddy current dampers it is also possible to make the conductor disk hollow, so that liquid cooling of the rotating disk is also possible here. In general, it is also possible for all details mentioned in WO 2019/029839 with regard to the eddy-current damping unit described therein to also be used for the Cardan joint suspension presented here according to the invention. These details are:

Enhancement of the Damper Effect by Means of a Ferromagnetic Element
(as shown in FIG. 4 in WO 2019/029839);
Radial magnet arrangement
(as shown in FIG. 5; 1.4.2 in WO 2019/029839);
Special arrangement of the magnets
(as shown in FIG. 6 in WO 2019/029839);
Adaptive centrifugal braking effect
(as shown in FIG. 9 in WO 2019/029839
Adaptive damping by centrifugal governors
(as shown in FIG. 10 in WO 2019/029839)
More disk designs
(as shown in FIG. 11 in WO 2019/029839)
Temperature compensation
(as shown in FIG. 19 and FIG. 20 in WO 2019/029839)

The invention claimed is:

1. A damping pendulum suspension (1), for a pendulum damper in a vibration system, comprising:
   a Cardan joint (1) having two cross-connected shafts (1.3), and
   a holding device (1.7) for receiving and holding a pendulum rod with a pendulum mass,
   wherein each of the two shafts (1.3) of the Cardan joint (1.1) has (i) at least one transmission gearing (1.2),
   (ii) at least one rotating damping unit (1.4) which generates eddy current, and the damping element (1.4) being attached, in each case, to a rapidly rotating gearing output side (1.2),
   (iii) an elastomeric torsional bearing, in a shape of a bushing (19), is connected to each of the shafts (1.3) via a slowly rotating gearing input side, and
   (iv) a torque arm (23) is provided, which transmits only circulating torque, and is mounted largely load-free in a remaining spatial axes, so that an entire angle of movement of the damper is shifted into the gearing rotation.

2. The pendulum suspension according to claim 1, wherein the elastomeric bushing is provided in a conical form (19.1).

3. The pendulum suspension according to claim 1, wherein the torque arm (23) is provided with an idle angle (24) in order to achieve a pulse effect.

4. The pendulum suspension according to claim 1 wherein the eddy-current damping element (1.4) comprises a conductor disk (1.4.3, 1.4.4) and a disk (1.4.1, 1.4.4) provided with permanent magnets or electromagnets (1.4.2), the two disks are separated from one another by an air gap so as to face one another, and, triggered by a pendulum movement, one disk rotates relative to the other disk about a relevant shaft (1.3), as a result of which an eddy current is generated which damps the pendulum movement.

5. The pendulum suspension according to claim 4, wherein the damping elements (1.4) have a rotating mass (1.4.7) which is attached to the respective rotating disk (1.4.1 or 1.4.4).

6. The pendulum suspension according to claim 5, wherein the rotating mass (1.4.7) is variably adjustable such that a natural frequency of the vibration system is influenced.

7. The pendulum suspension according to claim 1, wherein the rotating damping element (1.4) is rotationally symmetrical and has a variable diameter such that the damping of the vibration system is influenced.

8. The pendulum suspension according to claim 1 wherein the pendulum suspension has two or more transmission gearings (1.2) each having a different transmission and/or a different damping according to different directions in which damping is intended to be achieved.

9. A pendulum damper comprising at least one damping pendulum suspension according to claim 1, and at least one pendulum rod (2) or linkage rod (6) and a pendulum mass (3, 7).

10. The pendulum damper according to claim 9, wherein the pendulum suspension (1) is attached at the end of the pendulum rod (2) opposite the pendulum mass (3).

11. The pendulum damper according to claim 10, wherein the pendulum damper is designed as a transversal pendulum damper, and the pendulum mass (7) is attached to and guided on articulated linkage roads (6).

12. The pendulum damper according to claim 9, wherein the pendulum damper is attached in a tower, in or beneath a nacelle or underneath a helicopter platform of a wind turbine.

13. A wind turbine, comprising a tower and a nacelle having a rotor and rotor blades, wherein the wind turbine has a pendulum damper according to claim 9.

14. A wind turbine, comprising a tower and a nacelle having a rotor and rotor blades, wherein the wind turbine has a pendulum suspension according to claim 1.

* * * * *